(12) United States Patent
Kittson et al.

(10) Patent No.: US 6,192,650 B1
(45) Date of Patent: Feb. 27, 2001

(54) WATER-RESISTANT MASTIC MEMBRANE

(75) Inventors: Mark Kittson, Niagra Falls; Darryl Williams, Oakville, both of (CA)

(73) Assignees: Bay Mills Ltd., St. Catherines (CA); CertainTeed Corporation, Valley Forge, PA (US)

( * ) Notice: Subject to any disclaimer, the term of this patent is extended or adjusted under 35 U.S.C. 154(b) by 0 days.

(21) Appl. No.: 09/074,684

(22) Filed: May 8, 1998

Related U.S. Application Data

(63) Continuation-in-part of application No. 08/669,167, filed on Jun. 24, 1996, now abandoned.

(51) Int. Cl.[7] ............................................. E04B 1/00
(52) U.S. Cl. .............................. 52/741.4; 52/746.1
(58) Field of Search ........................ 156/71; 52/741.4, 52/746.1; 428/408, 286, 288, 290

(56) References Cited

U.S. PATENT DOCUMENTS

| | | |
|---|---|---|
| 3,967,032 | 6/1976 | Plotz et al. . |
| 4,151,025 | 4/1979 | Jacobs . |
| 4,386,981 | 6/1983 | Clapperton . |
| 4,588,458 | 5/1986 | Previsani . |
| 4,599,258 | 7/1986 | Hageman . |
| 4,699,542 | 10/1987 | Shoesmith . |
| 4,957,390 | 9/1990 | Shoesmith . |
| 5,110,627 | 5/1992 | Shoesmith . |
| 5,152,633 | 10/1992 | Mercer et al. . |
| 5,246,306 | 9/1993 | Shoesmith . |
| 5,393,559 | 2/1995 | Shoesmith . |
| 5,439,540 | 8/1995 | Lippman et al. . |
| 5,456,785 | 10/1995 | Venable . |

OTHER PUBLICATIONS

Grace Masonry Products: "The System Solution to Complete Protection in Masonry Walls", Grace Construction Products, Trade Publication, 04242/GRA, Buyline 6205 (1994).

*Primary Examiner*—Beth A. Stephan
(74) *Attorney, Agent, or Firm*—Duane, Morris & Heckscher LLP

(57) ABSTRACT

This invention provides reinforced, water-resistant structures, and methods of manufacturing and installing such structures. These structures include bituminous mastic material having first and second major surfaces and semi-rigid, open mesh material disposed within the mastic material. The structure may be prefabricated or assembled in situ and can be bonded to an underlying substrate by the application of heat or pressure to form an adherent bond. The reinforced structure has a tensile strength of at least about 300 psi or more.

20 Claims, 3 Drawing Sheets

WATER-RESISTANT MASTIC MEMBRANE

CROSS-REFERENCE TO RELATED APPLICATION(S)

This application is a continuation-in-part of U.S. patent application Ser. No. 08/669,167 of the same title, filed Jun. 24, 1996 now abandoned.

FIELD OF THE INVENTION

This invention relates to reinforced, water-resistant structures used in water-proofing applications, and more particularly, to reinforced mastic weather-proofing systems.

BACKGROUND OF THE INVENTION

Many outdoor surfacing applications have employed asphalt for its weather resistance and superior mechanical properties under heavy loads. Asphalt is a dark cementitious material composed predominantly of bitumens. Most asphalts are now produced from the refining of petroleum and are used primarily in paving and roofing applications. At normal service temperatures asphalt is viscoelastic; at higher temperatures, it becomes viscous.

The water resistance of asphalt layers is essential to its durability. Asphalts that have a low content of asphalt is viscoelastic; at higher temperatures, it becomes viscous.

The water resistance of asphalt layers is essential to its durability. Asphalts that have a low content of soluble salts show a low water absorption. When asphalt picks up water, it softens and blisters. Bacteria and fungi are also known to attack the very low molecular weight portion of bituminous materials. Exposed asphalt films have, additionally, been known to harden and crack when exposed to ultraviolet radiation.

Asphalt-mastics are known to include mineral fillers which are added to influence their flow properties and reduce costs. Mineral-filled films show proven resistance to flow at elevated temperatures, improved impact resistance and better flame-spread resistance. Fillers may also increase the water absorption of asphalt, and can include ground limestone, slate flowers, finely divided silica, trapped rocks, and mica. Opaque fillers offer protection from weathering, and asbestos filler, because of its fibrous structure can be added to improve toughness. Asbestos fibers have also been added to asphalt paving mixes to increase the resistance to movement under traffic, and in roofing materials, for fire-retardant purposes.

Numerous prefabricated asphalt-based membranes have been produced for smaller surface-area applications, such as in the patching of roads and roofs. Such membranes can be non-reinforced, or lightly reinforced and are known to have pressure sensitive characteristics. One example of a commercial membrane product, Road Glass from Owens-Corning Fiberglass, provides a membrane capable of accepting an embedded reinforcement at the job site. The Road Glass system involves melting asphalt-based mastic onto the targeted surface, followed by the application of a fiberglass layer, and then, an additional layer of asphalt mastic is provided to produce a composite membrane.

SUMMARY OF THE INVENTION

Reinforced water-resistant structures are provided by this invention which preferably include a fiber-containing reinforcement layer disposed within bituminous mastic for enhancing the mechanical properties of the mastic.

A first preferred embodiment of this invention is constructed as a prefabricated membrane comprising a rubberized asphalt mastic layer reinforced with semi-rigid, open-mesh, glass fiber reinforcement. A fabric carrier layer may be located beneath a first major surface of the mastic layer for enabling complete filling of the openings in the glass fiber reinforcement layer by the mastic. The membrane can be provided in roll form and can be bonded either by heat or pressure to an underlying substrate. The membrane of has favorable mechanical properties due to the fiberglass reinforcement mesh, including a tensile strength of at least about 300 pounds/inch. The membrane can be applied without a tack coat and is relatively easy to install.

According to a further preferred embodiment, the present invention contemplates assembly of a water-resistant structure in situ. More particularly, a first layer of bituminous mastic may be laid on a substrate, a layer of reinforced, semi-rigid, open-mesh glass fiber material may be placed on the first bituminous layer, and a second bituminous mastic layer may be laid atop the glass fiber material to thereby embed the glass fiber material in the mastic.

BRIEF DESCRIPTION OF THE DRAWINGS

The accompanying drawings illustrate embodiments of the invention according to the practical applications of the principles thereof, and in which.

DETAILED DESCRIPTION OF THE INVENTION

Water-resistant structures, and methods of manufacturing and installing such structures are provided by the present invention. The mastic-based structures disclosed herein are useful for many applications requiring water-resistance and durability. Such applications include road surfacing, roofing, bridge decking and metal coating. The reinforced structures according to the invention possesses a tensile strength of at least about 300 pounds/inch and up to about 500–600 pounds/inch in the most preferred embodiments. This is significantly greater than most commercial surface patching laminates which are known to have a tensile strength of only about 250–300 pounds/inch. The overall thickness of the structures according to the invention are preferably less than about 250 millimeters, and more preferably, less than about 50–150 millimeters.

Figure 1:
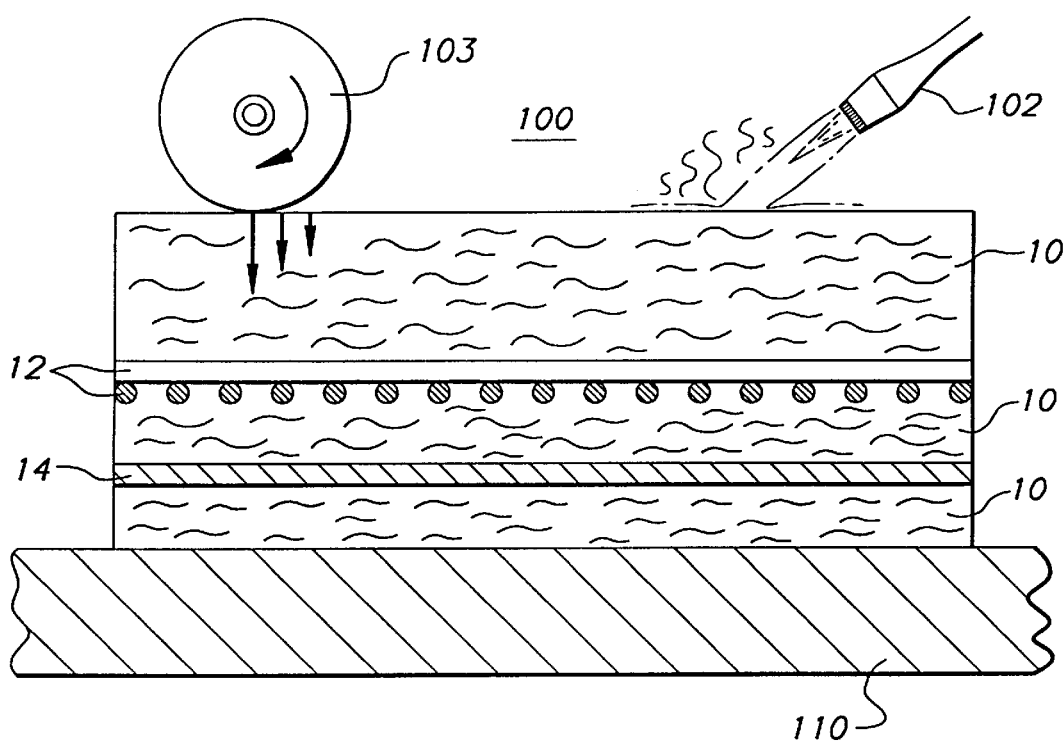
FIG. 1 is a diagrammatic side view of the application of a preferred water-resistant membrane of this invention to a substrate.
Figure 2:
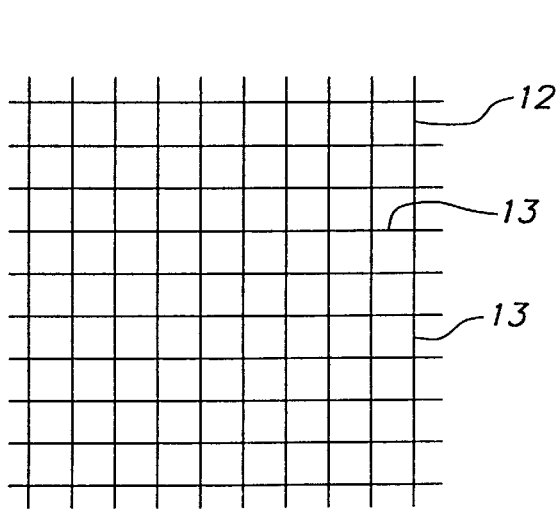
FIG. 2 is a top plan view of a glass fiber-reinforcement layer for the preferred membrane of this invention.
Figure 3:
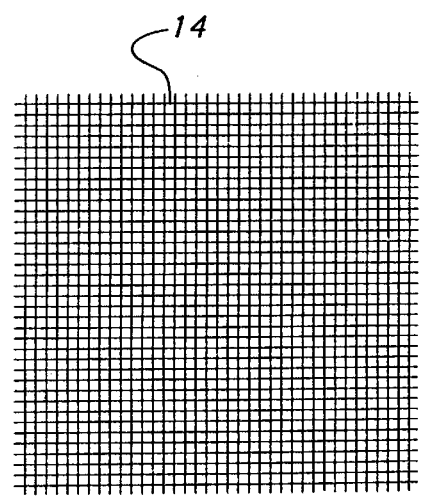
FIG. 3 is a top plan view of a preferred fabric carrier layer for the water-resistant membrane of this invention.
Figure 4:
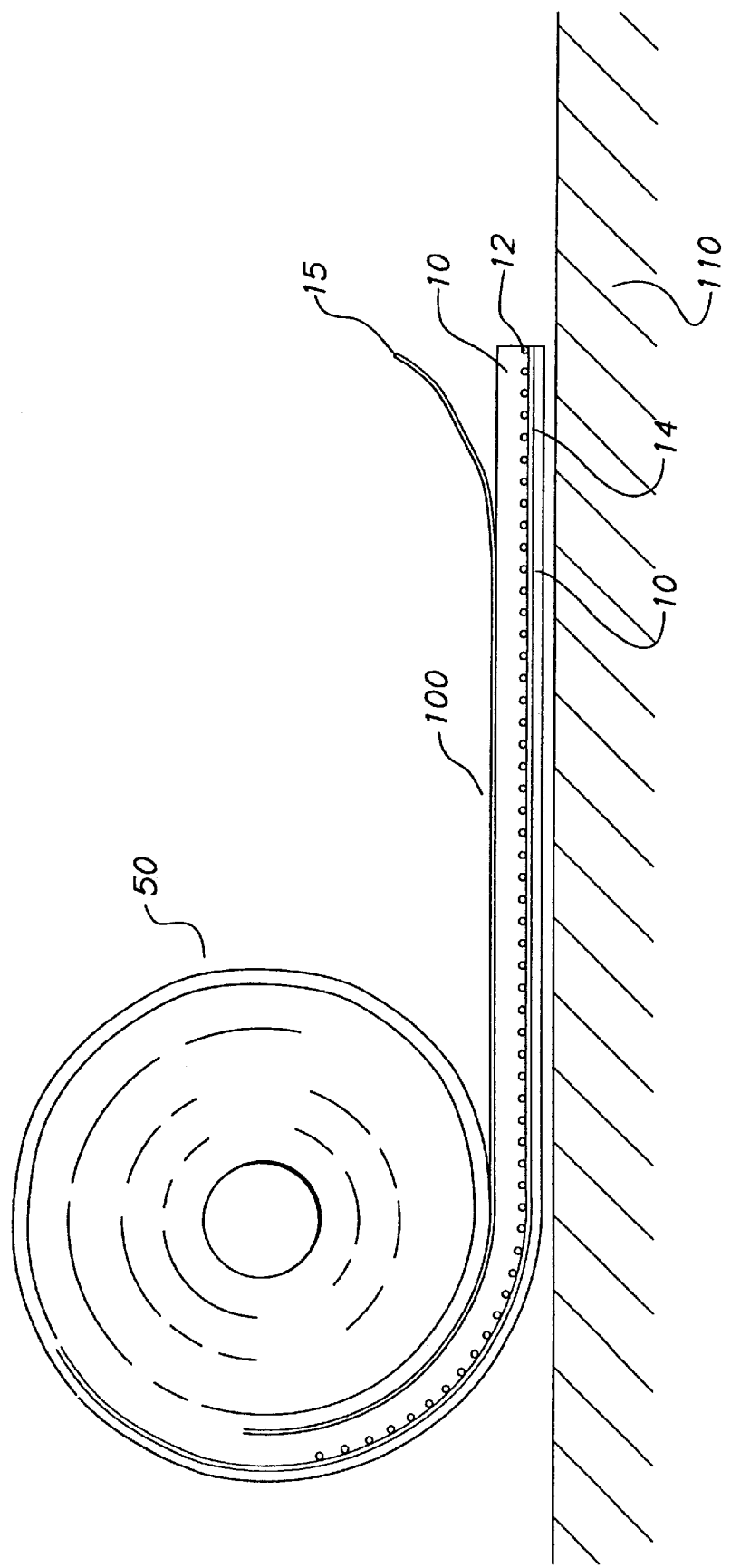
FIG. 4 is a diagrammatic side view of a roll configuration for the water-resistant membrane of this invention.

With reference to the figures, and in particular, to FIG. 1, there is shown a preferred prefabricated, water-resistant structure 100 according to the present invention. Structure 100 comprises mastic material 10 and a carrier layer 14 and a reinforcing layer 12 embedded within the mastic material 10. The reinforcing layer 12 assists in improving the mechanical properties of the membrane and the carrier layer 14 is designed to assist in the manufacture of the membrane and may, but may not necessarily, contribute to improved mechanical performance.

The mastic according to the invention preferably contains a bituminous preparation having adhesive and sealing properties. The preferred mastic material is petroleum-derived asphalt. Petroleum-derived asphalt may be manufactured by a number of popular methods, including reduction from crude oil, air-blowing from asphalt stock or flux, propane diasphalting from residuum stock, asphalt derived from a thermal cracking process, blended asphalts and asphalt emulsions containing disbursed immiscible liquids.

The asphalt mastic may also contain additives for improving its hardness and durability, including, without limitation, fibers and clays, as well as casein gelatine or blood albumin as peptizing agents. Other preferred additives for the mastic layer 10 are natural or synthetic rubber additives. The preferred rubber materials are capable of recovering substantially in shape and size after removal of a deforming force. Both thermoplastic elastomers and thermosetting rubbers can be used. Suitable synthetic rubbers may include, for example, urethanes, styrenics, olefinics, copolyesters, silicones, elastomeric alloys, polyamides, melt processible rubbers, neoprene, nitrile, chloroprene, styrene, butadiene, styrene butadiene, and recycled rubber, such as chopped up tires. Specific candidates include SBS, SIS, SEBS or PP types. Such rubbers can also include reinforcing agents, fillers, softeners, extenders and vulcanization agents, plasticizers and auxiliary materials.

Reinforcing layer 12 preferably invention includes a scrim or grid, desirably an open mesh, bi-axially oriented, knit fiber fabric 13 having a tensile strength of at least about 250 pounds/inch, and preferably greater than 300–500 pounds/inch which is thermally stable to at least 400° F. The grid may be formed of strands of continuous filament glass fibers, though other high modulus fibers such as polyamide fibers of poly(p-phenylene terephthalamide), known as Kevlar®, may be used. Alternative fibers can include, for example, polyester, rayon, or combinations of polyester and rayon with glass fibers. Various deniers and scrim patterns can be used so long as patterns provide a sufficient mechanical strength to the resulting structure 100 and are easily penetrated by molten mastic. ECR or E glass rovings of weights ranging from about 300 to about 5000 tex are preferred. These strands, which are preferably low-twist (i.e., about one turn per inch or less), are formed into grids with rectangular or square openings, preferably ranging in size from 0.25 to about 0.5 inch on a side, though grids ranging from 0.125 inch to six inches on a side may be used. The grids are preferably stitched or otherwise fixedly connected at the intersections of the crosswise and lengthwise strands. This connection holds the reinforcement in its grid pattern, prevents the strands from spreading out unduly before and during impregnation, and preserves the openings.

The large grid openings permit the asphalt mastic mixture to encapsulate each strand of yarn or roving completely and permit complete and substantial contact between underlying and overlying mastic layers thereby increasing the strength of the final structure. This permits substantial transfer of stresses from the substrate to the glass fibers. The product has a high modulus of elasticity and a high strength to cost ratio, its coefficient of expansion approximates that of road construction materials, and it resists corrosion by materials used in road construction and found in the road environment, such as road salt.

The fixed connections at the intersections of the grid also contribute to the strength of the grid because they permit forces parallel to one set of strands to be transferred in part to the other set of parallel strands. At the same time, this open rid construction makes possible the use of less glass per square yard and therefore a more economical product. For example, a presently preferred grid weighs about 12 ounces per square yard, although 4 to 18 ounces per square may be used. By comparison, some prior art roadway reinforcement structures employed fabrics having weights of about 24 ounces of glass per square yard.

Stitching the grid intersections together on warp-knit, weft-insertion knitting equipment using 70 to 150 denier polyester is preferred. However, other methods of forming grids with fixedly-connected intersections may be utilized. For example, a non-woven grid made with thermosetting or thermoplastic adhesive may provide a suitable grid.

Once the grid is formed, and before it is laid in place on paving, a resin is applied. That is to say, the grid is "pre-impregnated" with resin.

The viscosity of the resin is selected so that it penetrates into the strands of the grid. While the resin may not surround every filament in a glass fiber strand, the resin is generally uniformly spread across the interior of the strand. This impregnation makes the grid compatible with asphalt, imparts a semi-rigid nature to it, and cushions and protects the glass strands and filaments from corrosion by water and other elements. The impregnation also reduces abrasion between glass strands or filaments and the cutting of one glass strand or filament by another. The impregnation also reduces the tendency of the glass fibers to cut each other, which is particularly important after the grid has been laid down but before the overlayment has been applied.

While drying or curing the resin on the grid, the strands may be somewhat flattened, but the grid-like openings are maintained. For example, in a preferred embodiment, a rectangular grid may be formed, with the rovings flattened to about $\frac{1}{16}$ inch, whereby the thickness of the rovings after coating and drying was about $\frac{1}{32}$ inch or less.

Many resins can be used for impregnating the grid, provided they are such that adhesives can be bonded to them well. Primary examples are asphalt, rubber modified asphalt, crosslinked and uncrosslinked acrylics and polyvinyl alcohol, unsaturated polyesters, vinyl ester, epoxies, polyacrylates, polyurethanes, polyolefines, and phenolics which give the required rigidity, compatibility, corrosion resistance and thermal stability. They may be applied using hotmelt, emulsion, solvent, thermal-cure or radiation-cure systems. Alternatively, an asphaltic emulsion modified with a polymeric material, such as an acrylic polymer, can be padded onto the grid and thermally cured. Such modification of the asphalt makes it possible to achieve a coating which is less brittle at low temperatures.

A preferred carrier layer 14 of this invention comprises a woven or non-woven fabric having relatively small pores. It is thermally resistant to at least 400° F. and provides a backing layer during the impregnation of the reinforcing layer 12 by the mastic. Once the reinforcing layer 12 has been impregnated and encapsulated in a mastic 10, the carrier layer 14 can be destroyed, or melted, by the molten mastic material, since it is designed to provide only limited performance to the resulting structure 100. In the preferred embodiment, however, the carrier layer 14 is embedded between the reinforcing layer 12 and a second major surface of the structure 100.

The prefabricated structure 100 of this invention may be provided in flat or roll form, or in individual packages. One or both major surfaces can be provided with a tack-killer material, such as fine silica aggregate of about 1 micron to about 3 millimeters in diameter, or a woven or non-woven mat. Alternatively, a release liner 15 can be provided on at least one surface for permitting the membrane to be rolled into itself for convenient transport.

Prefabricated structures according to this invention may be manufactured by many processes, including spraying asphalt emulsion onto the reinforcing and carrier layers 12 and 13, or by dipping these layers through a molten mastic tank having a temperature of about 400°–420° F. The reinforcing and carrier layers 12 and 14 can be unwound from a pair of rolls with the carrier layer forming the lower most surface of the laminate prior to applying the mastic material. A knife-over-roll coater can be provided following the application of the mastic to define a gauge of about 50–150 millimeters, and more preferably, about 120 millimeters in thickness. The resulting coated web can be dried at ambient temperature or sent through a drying oven prior to cutting and rolling the mastic into a convenient form, such as a roll or patch. A release liner 15 can be applied to one face and sand or powder silica applied to the opposite face prior to rolling.

Structure 100 can be applied using heat, pressure, or both to any substrate surface 110. In a preferred embodiment, the structure 100 is applied to a substrate by removing the release liner 15 and applying the lower major surface of the mastic layer 10 to the substrate surface 110. Pressure, heat, or both are then applied to the top tack-killer surface and the structure may be compressed to form an adherent bond with the substrate 110. The flame applicator 102 or roll applicator 103 can be used for this purpose.

Figure 5A:
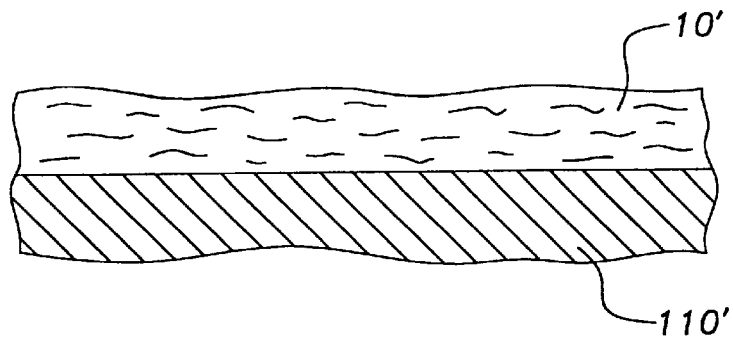
FIGS. 5A, 5B and 5C depict an in situ installation of bituminous mastic material and reinforced open mesh glass fiber material layers to produce a reinforced water-resistant structure according to a further embodiment of the invention.
Figure 5B:
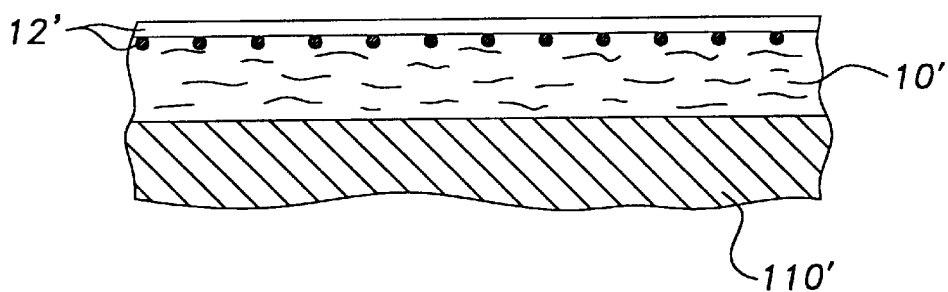
Figure 5C:
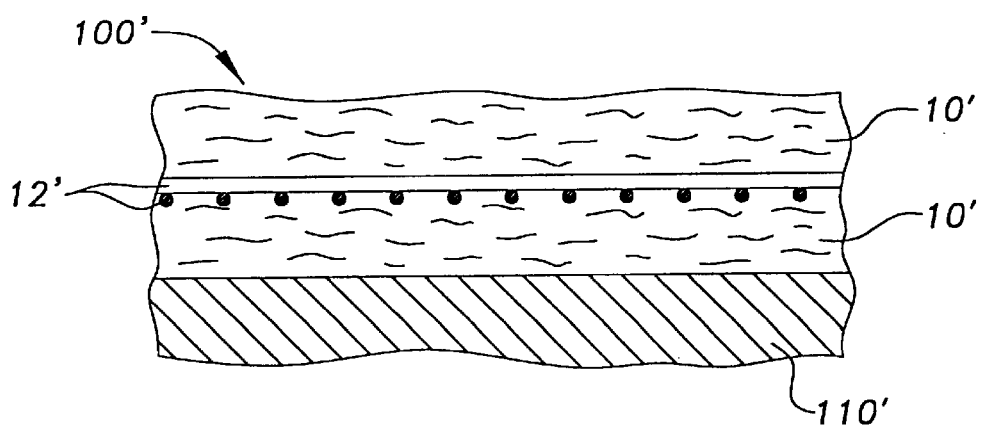

FIGS. 5A, 5B and 5C disclose a further preferred embodiment of a water-resistant structure according to the present invention. The substrates and structural elements discussed in connection with FIGS. 5A–5C are preferably the same as those described above with regard to FIGS. 1–4. However, to distinguish the manner of product installation from that of FIGS. 1–4, the features of FIGS. 5A–5C bear prime (') symbols versus their counterparts in the earlier figures.

According to this embodiment, a first layer bituminous mastic material 10' is laid atop a substrate 110 as shown in FIG. 5A. The first mastic layer 10' may be of any desired thickness and can be used to fill existing cracks, holes and the like that may be present in the upper surface of the substrate. As illustrated in FIG. 5B, once the first mastic layer 10' is smoothed by suitable raking or striking means, a layer of semi-rigid, open-mesh reinforcement material 12' is placed onto the first mastic layer. Thereafter an additional layer of bituminous mastic material 10' is placed over the reinforcement material 12' (FIG. 5C) thereby completely embedding the reinforcement, above and below, in mastic 10' to produce a composite water-resistant structure 100'.

As with structure 100, structure 100' may be subsequently exposed to heat and/or pressure to promote its adherence to substrate 110'.

Prominent among its many advantages, the sequential in situ installation of structure 100' enables the underlying substrate 110' to be patched and evenly covered with high strength bituminous mastic in a single step while producing a water-resistant structure to be assembled with optimum mastic thickness, composition and/or reinforcement material strength for the purposes for which the structure 110' is particularly designed.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A method of installing a reinforced, water-resistant structure on a substrate, said method comprising the steps of:
   (a) applying a mastic material having embedded therein a reinforcing layer to said substrate, said reinforcing layer comprising a semi-rigid, open mesh material having a tensile strength of at least about 300 pounds per inch; and
   (b) applying at least one of heat and pressure to said mastic material to adhere said mastic material to said substrate.

2. The method of claim 1 wherein said semi-rigid, open mesh material and said mastic material are combined in a roll, and step (a) further comprises unrolling said roll onto said substrate.

3. The method of claim 1 wherein said substrate comprises a roofing surface.

4. The method of claim 1 wherein said substrate comprises a road surface.

5. The method of claim 1 wherein said semi-rigid, open mesh material comprises glass fiber strands pre-impregnated with resin.

6. The method of claim 1 wherein said semi-rigid, open mesh material has a tensile strength of about 500–600 pounds per inch.

7. The method of claim 1 wherein said semi-rigid, open mesh material is thermally stable to at least about 400° F.

8. A reinforced, water-resistant structure constructed in accordance with the method of claim 1.

9. A method of installing a reinforced, water-resistant structure on a substrate, said method comprising the steps of:
   (a) applying a first layer of bituminous mastic material to a substrate;
   (b) disposing a layer of semi-rigid, open mesh material on said mastic layer; and
   (c) applying a second layer of bituminous mastic material on said semi-rigid, open mesh material to embed said mesh material within said first layer of bituminous mastic material and said second layer of bituminous mastic material.

10. The method of claim 9 further comprising the step of applying at least one of heat and pressure to at least one of said first layer of bituminous mastic material and said second layer of bituminous mastic material to adhere said structure to said substrate.

11. The method of claim 9 wherein said semi-rigid, open mesh material and said bituminous mastic material are combined in a roll, and step (a) further comprises unrolling said roll onto said substrate.

12. The method of claim 9 wherein said substrate comprises a roofing surface.

13. The method of claim 9 wherein said substrate comprises a road surface.

14. The method of claim 9 wherein said semi-rigid, open mesh material comprises glass fiber strands pre-impregnated with resin.

15. The method of claim 9 wherein said semi-rigid, open mesh material has a tensile strength of at least about 300 pounds/inch.

16. The method of claim 9 wherein said semi-rigid, open mesh material is thermally stable to at least about 400° F.

17. A reinforced, water-resistant structure constructed in accordance with the method of claim 9.

18. A method for reinforcing a road surface comprising applying to said road surface a mastic material having embedded therein a reinforcing layer, said reinforcing layer comprising a semi-rigid, open mesh material having a tensile strength of at least about 300 pounds per inch.

19. The method of claim 18 wherein said mastic comprises a bituminous preparation.

20. The method of claim 19 wherein said bituminous preparation comprises asphalt.

* * * * *